May 2, 1967 J. V. ROGERS 3,317,743

PULSE GENERATOR CIRCUIT

Filed June 11, 1962

JOHN V. ROGERS,
INVENTOR.

BY

BUCKHORN, CHEATHAM & BLORE,
ATTORNEYS.

3,317,743
PULSE GENERATOR CIRCUIT

John V. Rogers, Portland, Oreg., assignor to Tektronik, Inc., Beaverton, Oreg., a corporation of Oregon Filed June 11, 1962, Ser. No. 201,457
9 Claims. (Cl. 307—88.5)

Figure 1:
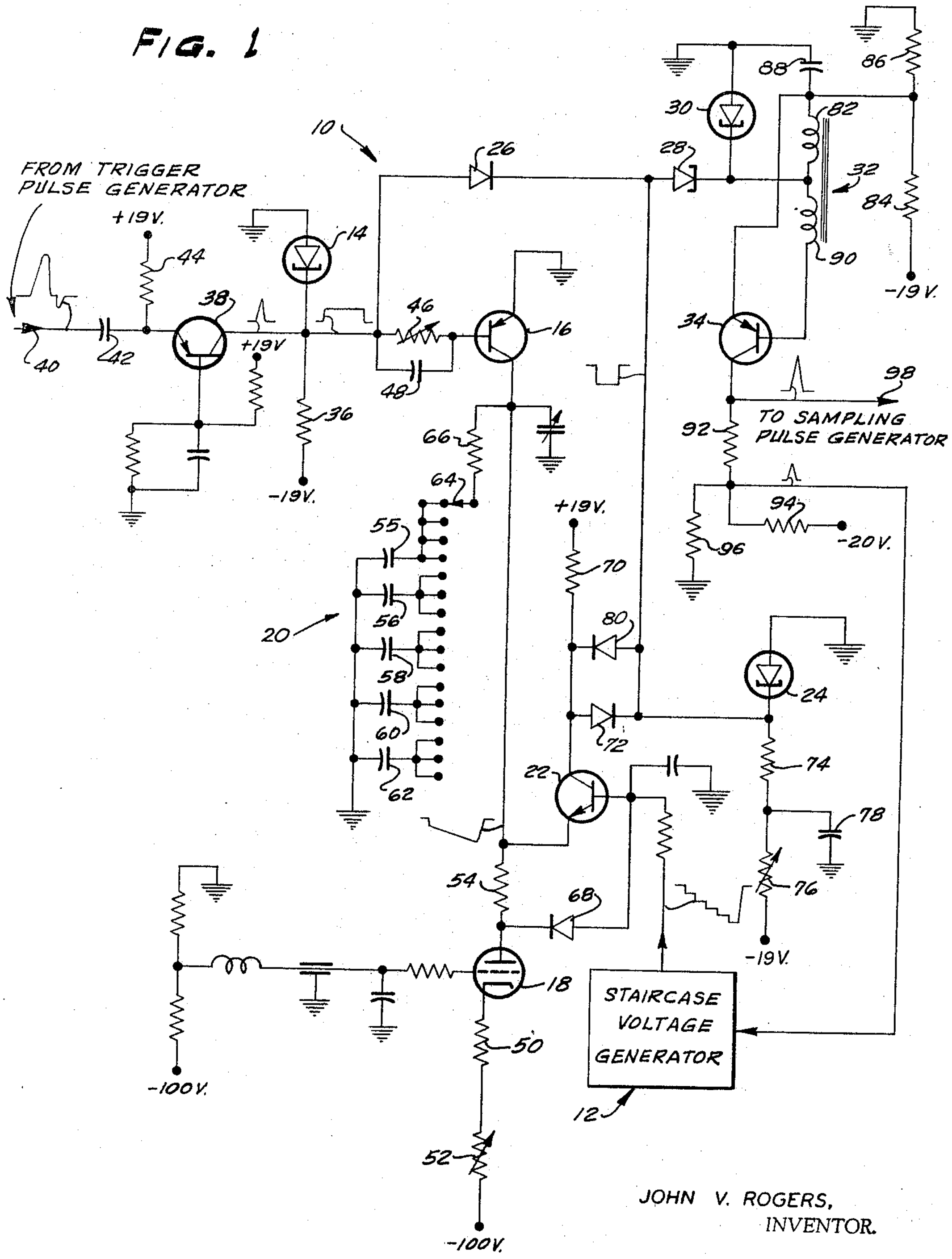

The subject matter of the present invention relates generally to pulse generator circuits in which an output pulse is produced at a time related to the receipt of an input trigger pulse after a variable, predetermined, controllable time delay; and more specifically is directed to a fast ramp voltage generator and comparator circuit which produces a fast ramp voltage pulse in response to an input trigger pulse, compares such fast ramp voltage pulse with a stairstep voltage reference voltage to produce a difference signal when the increasing voltage of such fast ramp pulse exceeds that of such reference voltage, and converts such difference signal into an output pulse which is delayed in time with respect to such input trigger pulse. The staircase reference voltage is increased one stairstep for each output pulse produced so that successively greater voltages of the fast ramp pulses are required to produce a difference signal, and each successive output pulse is delayed in time with respect to the input trigger pulse by a progressively greater amount due to this increase in the staircase reference voltage as the result of the production of each output pulse.

The fast ramp generator and comparator circuit of the present invention is particularly useful in a sampling type of cathode ray oscilloscope which may be employed to display at a much lower frequency the waveform of a repetitive vertical input signal which may have a frequency of the order of 1,000 megacycles per second or hgiher. Such a high frequency signal cannot be displayed in the usual manner on a conventional oscilloscope because it is beyond the frequency capability of the vertical deflection system of the cathode ray tube of such oscilloscope. For relatively large amplitude vertical input signals a special cathode ray tube having a traveling wave or distributed type deflection system can be employed to great advantage, especially where transient signals are being studied. However, for smaller amplitude signals the high frequency signal waveform must, instead, be displayed by a sampling method which extracts a different sample portion from each of a plurality of successive waveforms of the repetitive signal and adds such sample portions together to form a composite waveform on the fluorescent screen of the oscilloscope which is an accurate reproduction at a lower frequency of the actual waveform of such signal. A circuit for performing this sampling operation is shown in my copending U.S. patent application, Ser. No. 131,647, filed Aug. 15, 1961, and entitled, "Pulse Generator Circuit", now U.S. Patent 3,214,607. The fast ramp generator circuit of the present invention is an improvement on the circuit desclosed in the above-mentioned patent application and will be described in detail only with regard to the differences over that circuit.

The fast ramp generator and comparator circuit of the present invention has an advantage over the circuit of my previous patent application in that the present circuit is not sensitive to the rise time or rate of the difference signal produced at the output of the comparator circuit so that the necessity for connecting a compensation inductance into the circuit to eliminate the effect of large capacitance timing capacitors in the fast ramp pulse forming network, as was previously necessary, is eliminated.

Another advantage to the present circuit is that it prevents improper triggering of the output pulse generator of such circuit by the output trigger signal from the output trigger multivibrator. This is accomplished by connecting such multivibrator as a bistable multivibrator and reverting such multivibrator to its original stable state from is triggered by a portion of the output pulse so generated. This prevents more than one output pulse from being produced by a single fast ramp pulse as well as eliminating any possible error in the time of generation of said output pulse due to "rate sensitivity" of the output trigger multivibrator. In addition, the present fast ramp generator and comparator circuit has fewer components so that it is less expensive to build and more reliable to operate.

Briefly, the fast ramp generator and comparator circuit of the present invention may include a regulated source of substantially constant current which is normally transmitted to ground through a normally conducting gating transistor but which is also connected to a pulse forming network having at least one capacitor which is charged by current from such regulated source to form a fast ramp voltage pulse when such gating transistor is rendered nonconducting. The conduction of the gating transistor is controlled by a pair of tunnel diodes which are each connected as bistable multivibrators. One of the tunnel diodes is connected to the input of such transistor and when triggered by an input trigger pulse which may be derived from the vertical signal of the oscilloscope, causes the gating transistor to become nonconducting to allow the production of a fast ramp voltage pulse. The fast ramp pulse is transmitted to a comparator transistor where it is compared with a stairstep voltage reference signal also applied to such comparator transistor, to produce a difference signal which triggers the other of such bistable tunnel diodes to generate an output trigger signal. The output trigger signal so generated is transmitted through a feedback diode to revert the first bistable tunnel diode back to its original stable state to render the gating transistor conducting again. A portion of this output trigger signal is also transmitted through a backward diode to a third tunnel diode which is connected as a monostable oscillator, to trigger such tunnel diode and cause it to produce an output pulse. A portion of this output pulse is transmitted through the backward diode to revert the second bistable tunnel diode back to its original stable state. Another portion of the output pulse is also transmitted to the staircase reference voltage generator in order to increase such reference voltage by one voltage step.

An object of the present invention is to provide an improved pulse generator circuit.

Another object of the present invention is to provide an improved electrical circuit for generating output pulses which are delayed for a variable, predetermined, controllable time with respect to the receipt of input trigger pulses.

Still another object of the invention is to provide an improved electrical circuit for generating an output pulse which is delayed for a variable predetermined, controllable time with respect to an input trigger pulse, which circuit will produce an output pulse at the proper time with respect to the input trigger pulse regardless of changes in the rise time or rate of increase of voltage of a fast ramp voltage utilized in such circuit.

A further object of the present invention is to provide an improved fast ramp generator and comparator circuit which is not sensitive to the slope of the fast ramp pulse produced therein and does not require a change in circuit inductance to compensate for changes in capacitance of the ramp pulse forming network in order to produce output pulses in a proper time relation to input trigger pulses applied thereto.

A still further object of the present invention is to provide an improved fast ramp generator and comparator circuit which utilizes the high speed capabilities of a pair of tunnel diodes operating as bistable multivibrators and connected to the input and output of a gating transistor in order to control the flow of current through a fast ramp pulse forming network in conjunction with other circuit components to enable the ramp pulse forming network to operate accurately when timing of different capacitors are substituted in such ramp pulse forming network.

A still further object of the invention is to provide an improved fast ramp generator and comparator circuit for use in a sampling type of cathode ray oscilloscope to produce a sampling or interrogating pulse which is delayed in time with respect to an input trigger pulse by an exact predetermined amount regardless of the slope of the fast ramp pulse employed, which time increases with successive sampling pulses.

Additional objects and advantages of the present invention will be apparent from the following detailed description of a preferred embodiment thereof shown in the attached drawings.

The single figure of the drawing is a schematic diagram of the preferred embodiment of the fast ramp generator and comparator circuit of the present invention.

Referring to the drawing, the fast ramp generator and comparator circuit 10 of the present invention is shown as being connected to a staircase voltage generator circuit 12 which supplies a negative stairstep reference voltage to such fast ramp generator and comparator circuit for a purpose hereafter described. The fast ramp generator and comparator circuit 10 includes a first tunnel diode 14 connected as a bistable multivibrator to the base of a PNP type gating transistor 16 which controls the flow of current from a constant current tube 18 through a pulse-forming network 20 including a plurality of capacitors. When an input trigger signal is received by the first tunnel diode 14 it switches to its low voltage stable state to produce a positive going signal on its cathode which is applied to the base of gating transistor 16 to render such transistor nonconducting so that current from tube 18 flows through network 20. A negative fast ramp voltage pulse is produced in the pulse-forming network 20 and transmitted to the emitter of an NPN type comparator transistor 22 whose base is connected to the staircase voltage generator 12. The staircase reference voltage is compared with the fast ramp voltage to produce a difference signal on the collector of such comparator transistor when the voltage of the fast ramp exceeds the reference voltage. This difference signal is transmitted to a second tunnel diode 24 connected as a bistable multivibrator to switch such tunnel diode so that it produces a negative output trigger signal which is partially transmitted through a feedback diode 26 to revert the first tunnel diode 14 back to its original stable state of conduction. This renders gating transistor 16 again conducting to stop the generation of the fast ramp voltage pulse.

A backward diode 28 is connected between the second tunnel diode 24 and a third tunnel diode 30, which may be connected as a one-shot multivibrator or monostable oscillator, so that a portion of the output trigger signal produced by the second tunnel diode is transmitted through such backward diode to trigger such third tunnel diode and cause it to produce a negative going output pulse. This negative going output pulse is transmitted through an autotransformer 32 to an amplifier transistor 34 which inverts such negative output pulse so that it appears as a positive output pulse on the collector of such transistor. A portion of this positive output pulse is transmitted to the staircase voltage generator 12 to cause the stairstep reference voltage produced by such generator to increase one voltage step for each output pulse received by such generator. The negative going output pulse from the cathode of the third tunnel diode 30 is also utilized to revert the second tunnel diode 24 back to its original stable state. Thus the positive going trailing edge of such negative output pulse is transmitted through the backward diode 28 of the cathode of the second tunnel diode to switch such second tunnel diode back to its normal low voltage stable state.

The first tunnel diode 14 has its anode connected to ground and its cathode connected to a source of negative D.C. bias voltage through a load resistor 36 so that such tunnel diode functions as a bistable multivibrator normally biased to its high voltage stable state so that a positive trigger pulse applied to its cathode will produce an extremely fast rising positive output signal across such load resistor. This positive trigger pulse may be supplied by a PNP-type amplifier transistor 38 connected as a common base amplifier with its collector connected to the cathode of the first tunnel diode, its emitter connected to an input terminal 40 and its base connected to a suitable biasing circuit so that such transistor is normally slightly forward biased and conducting. Input trigger pulses, which may be derived from the vertical signal of the oscilloscope, are applied to the input terminal 40 and transmitted through a differentiating circuit including a coupling capacitor 42 and coupling resistor 44 as positive and negative spike trigger pulses. The positive spike trigger pulses are transmitted through the amplifier transistor 38 since they increase the forward bias on emitter junction of such transistor, and are utilized to trigger the first tunnel diode. However, the negative spike trigger pulses are not transmitted through transistor 38 since they quickly overcome the small normal forward bias voltage and reverse bias the emitter junction of such transistor so that it is immediately rendered nonconducting. Thus a positive trigger pulse causes the first tunnel diode 14 to switch from its high voltage stable state to its low voltage stable state to produce a negative going signal on the anode of such tunnel diode and a positive going signal on its cathode.

The cathode of tunnel diode 14 is connected to the base of gating transistor 16 through a variable bias resistor 46 shunted by a bypass capacitor 48 so that the positive going signal produced on the cathode of the first tunnel diode is transmitted to the base of such gating transistor to render it nonconducting from its normal conducting condtion set by its biasing circuit including resistors 36 and 46. Gating transistor 16 has its collector connected to the anode of the constant current tube 18 which may be a triode vacuum tube of the Nuvistor type having its cathode connected to a source of negative D.C. supply voltage through a pair of series-connected cathode load resistors including a fixed resistor 50 and a variable resistor 52 whose setting determines the amount of current flow through such tube. The grid of such constant current tube 18 is connected to a source of negative D.C. bias voltage through a suitable biasing circuit so that the tube serves as a regulated current source to supply current having a substantially constant amplitude through a coupling resistor 54 to either the gating transistor 16 of the pulse-forming network 20 depending upon the conduction of such gating transistor.

The pulse-forming network 20 includes a plurality of different capacitors 55, 56, 58, 60 and 62 of successively greater capacitance having one plate connected to ground and the other plate connected to different switch terminals. Thus different ones of such capacitors may be connected by means of a selector switch 64 in series with a resistor 66 to provide the pulse-forming network. Once gating transistor 16 is rendered nonconducting, current from a regulated current source 18 flows through the pulse-forming network 20 including one of the capacitors 55, 56, 58, 60 and 62 to ground, thereby charging such one capacitor through resistor 66 to produce a sawtooth or fast ramp voltage pulse having a negative going leading edge which increases in value at a substantially linear rate depending upon the capacitor connected to switch 64. This fast ramp pulse signal is applied to the emitter fo the comparator transistor 22 which has its base connected to a negative D.C. reference voltage supplied by staircase voltage generator 12. The comparator transistor is normally nonconducting and only becomes conducting when the voltage of the negative going fast ramp exceeds the reference voltage to produce negative going difference signal on the collector of such transistor. A bypass diode 68 is connected between the plate of constant current tube 18 and the base of comparator transistor 22 to function as a protection device for the gating transistor 16. It prevents thermal destruction of such gating transistor as a result of the possible application of too high a reverse bias voltage across its collector junction due to the removal of transistor 22. The collector of comparator transistor 22 is connected to a source of positive D.C. bias voltage through a load resistor 70. The negative difference signal developed across this load resistor is transmitted through a normally forward biased coupling diode 72 having its cathode connected to the cathode of the second tunnel diode 24 and its anode connected to the collector of such comparator transistor.

The second tunnel diode 24 has its anode connected to ground and its cathode connected to a source of negative D.C. bias voltage through a fixed load resistor 74 and a variable load resistor 76 whose setting determines the biasing current for such tunnel diode. This variable load resistor 76 is shunted by decoupling capacitor 78. The load impedance of the second tunnel diode 24 causes such diode to operate as a bistable multivibrator having the hysteresis characteristic of a Schmitt Trigger multivibrator. Such tunnel diode is normally biased to its low voltage stable state by a biasing current slightly less than its "peak current." If the tunnel diode 24 has a peak current of 10 milliamperes, slightly more than 10 milliamperes normally flows through resistor 76 and then separates into about 2 milliamperes through coupling diode 72 and about 8 milliamperes through the tunnel diode. When the negative voltage difference signal reduces the current flow through diode 72 sufficiently to divert 2 milliamperes from it to the tunnel diode 24, the total current flowing through such tunnel diode is greater than its peak current and causes it to switch. A coupling diode 80 is connected in parallel with the coupling diode 72 and has its cathode connected to load resistor 70 and its anode connected to load resistor 74 so that the coupling diode 80 is normally reverse biased by the voltage drop across diode 72. The coupling diode 72 acts as a unidirectional resistance element which establishes a small positive D.C. bias voltage on the collector of comparator transistor 22 and a small negative D.C. bias voltage on the cathode of the second tunnel diode 24 due to the voltage drop across such diode. If the initial adjustment of the bias resistor 76 is improper so that the total current flow through such resistor is only 9.5 milliamperes, the 2 milliamperes supplied to the tunnel diode 24 by rendering coupling diode 72 nonconducting is not sufficient to switch such tunnel diode and the operation of the circuit would cease except for the presence of the coupling diode 80. When this happens coupling diode 804 becomes forward and conducts sufficient additional current from tube source 18 to switch the tunnel diode and to allow the operation of the circuit so that it can be adjusted properly.

When the circuit is properly adjusted, the negative difference signal is transmitted from comparator transistor 22 through coupling diode 72 to switch the second tunnel diode 24 to its high voltage stable state from its normal low voltage stable state so that a negative going output trigger signal is produced on the cathode of such tunnel diode. This negative going output trigger signal is transmitted partially through the feedback diode 26, which has its cathode connected to the cathode of tunnel diode 24 and its anode connected to the cathode of tunnel diode 14, so that the negative going feedback signal switches the first tunnel diode 14 back to its original high voltage stable state and renders the gating transistor 16 conducting. As a result of making the gating transistor again conducting the pulse-forming network 12 is disconnected from the current source 18 and the charge on the ramp pulse-forming capacitor begins to decrease to its normal quiescent value, thereby producing the positive going trailing edge of the ramp pulse and stopping the generation of such voltage pulse.

The backward diode 28 has its anode connected to the cathode of the second tunnel diode 24 and its cathode connected to the cathode of the third tunnel diode 30. A portion of the negative output trigger signal produced by the second tunnel diode 24 is transmitted through backward diode 28 to the cathode of the third tunnel diode 30 to trigger such a third tunnel diode to a high voltage state.

This negative output pulse is applied to the base of the amplifier transistor 34 through the secondary winding 90 of the autotransformer 32. The emitter of the amplifier transistor 34 is connected to the end of the primary winding 82 so that the emitter junction of such transistor is across both windings of such autotransformer. The collector of such amplifier transistor is connected to a source of negative D.C. bias voltage through a first load resistor 92 and a second load resistor 94. A bias resistor 96 having one end connected to ground is connected in series with the second load resistor 94 so that such bias resistor provides a negative D.C. bias voltage on the collector of transistor 34. The positive output pulse developed across load resistors 92 and 94 is supplied to an output terminal 98 which may be connected to the sampling or interrogating pulse generator (not shown) of the sampling type cathode ray oscilloscope. A smaller portion of the positive output pulse developed across load resistor 94 is applied to the stairstep voltage generator 12 to trigger the operation of such generator so that the reference voltage produced thereby increases in amplitude one voltage step for each output pulse received, as discussed previously. The negative output pulse produced on the cathode of tunnel diode 30 has a negative going leading edge and a positive going trailing edge. It is the positive going trailing edge of this output pulse which is transmitted through the backward diode 28 to the cathode of tunnel diode 24 to revert such second tunnel diode back to its original low voltage stable state so that another complete cycle of operation of the circuit is possible.

The fast ramp generator and comparator circuit of the present invention thus differs from that disclosed in my copending patent application previously referred to, by the use of the backward diode 28 to connect a second tunnel diode 24 to the third tunnel diode 30 and the connection of such second tunnel diode has a bistable multivibrator, rather than as a monostable multivibrator and by the elimination of inductance from its load inductance. Monostable tunnel diode multivibrators are "rate sensitive" in that the current of the trigger pulse required to switch them depends upon the rate of rise of the trigger pulse and it takes more current amplitude for a slow-rising trigger signal to switch a monostable multivibrator than it does for a fast rising trigger signal. Thus, if the second tunnel diode 24 were connected as a monostable multivibrator, it would trigger at different difference signal currents depending upon the particular timing capacitor employed in the fast ramp pulse-forming network 20, since the rise rate of such difference signal would vary with the particular capacitor used. In order to correct for this, the fast ramp generator comparator circuit of my copending application was provided with a compensation inductance which was manually switched into the load impedance circuit of the second tunnel diode to compensate for the large capacitance capacitors 60 and 62. The present circuit eliminates the need for such a compensation inductance by connecting the second tunnel diode 24 as a bistable multivibrator which is not "rate sensitive" and which will trigger at the same current regardless of the slope of the trigger signal.

However, in order to accomplish this result the bistable multivibrator formed by the second tunnel diode must be reverted to its original stable state after it has been triggered by the difference signal so that another cycle of operation can be performed. The trailing edge of the negative output pulse produced by the third tunnel diode 30 is employed for this purpose. It should be noted, however, that the second tunnel diode cannot be connected directly to the circuit of the third tunnel diode because the inductance of primary winding 82 would be seen as a load by such second tunnel diode and prevent it from functioning properly. For this reason the backward diode 28 is connected between the first and second tunnel diodes. Such backward diode effectively prevents the inductance of primary winding 82 from appearing as a load on the second tunnel diode 24, while at the same time transmitting the output trigger signal. The backward diode 28 is actually a tunnel diode having a low forward peak current and low impedance to flow of current in what would ordinarily be the reverse or backward direction. This reverse or backward operating characteristic enables the positive going trailing edge of the output voltage to be transmitted from the third tunnel diode 30 to the second tunnel diode 24 to revert it to its normal low voltage stable state. The extremely low impedance and rapid action of the backward diode as compared to an ordinary diode enables this action whereas an ordinary diode is not usable. The backward diode thus forms part of the load impedance of the second tunnel diode and at the same time transmits the positive going trailing edge of the negative output pulse back to the second tunnel diode to revert such tunnel diode.

It will be obvious that many changes may be made in the details of the fast ramp generator and comparator circuit of the present invention without departing from the spirit of the invention. Therefore, it is not intended to limit the scope of the present invention to the above-described preferred embodiment thereof, but such scope should only be determined by the following claims.

I claim:

1. An electrical circuit for generating an output pulse at a predetermined time after the application of an input trigger pulse, comprising:

signal forming means for generating a ramp voltage and comparing said ramp voltage with a reference voltage to produce a difference signal when said ramp voltage exceeds said reference voltage;

first bistable control means connected to said signal forming means and adapted to change from one stable conductive state to another stable state in response to an input trigger pulse to start the generation of said ramp voltage;

second bistable control means connected to said signal forming means and adapted to change from one stable state to another stable state in response to said difference signal to produce an output pulse;

feedback means connected from said second control means to said first control means for transmitting a portion of said output pulse to said first control means in order to cause said first control means to change back to its one stable state and to stop the generation of said ramp voltage;

reversion means actuated by a portion of said output pulse for causing said second control means to change back to its one stable state; and means responsive to said output pulse for changing said reference voltage by a predetermined amount for each output pulse received in order to vary said time between said input trigger pulse and said output pulse.

2. An electrical circuit for generating an output pulse at a predetermined time after the application of an input trigger pulse comprising:

gating means for controlling the flow of current through said gating means;

first bistable control means connected to the input of said gating means so that input trigger signals applied to said first control means will change it from one to the other of its two stable states to determine when said gating device is conducting and nonconducting;

signal forming means connected to said gating device so that said current flows in said signal forming means when said gating means is nonconducting to produce a comparison voltage;

comparator means for comparing said comparison voltage with a variable reference voltage and for producing a difference signal when said comparison voltage exceeds said reference voltage;

second bistable control means connected to the output of said comparator means so that said difference signal changes said second control means from one to the other of its two stable states to produce an output trigger signal;

feedback means connected from said second control means to said first control means so that a portion of said output trigger signal is transmitted through said feedback means to change said first control means back to its one stable state and to render said gating means conducting;

monostable oscillator output pulse generator means connected to said second control means for producing one output pulse for each output trigger signal; and unidirectional coupling means connected between said second control means and said output pulse generator means so that a portion of said output trigger signal is transmitted through said coupling means to trigger said pulse generator means to produce an output pulse and so that a portion of said output pulse is transmitted through said coupling means to change said second control means back to its one stable state.

3. An electrical circuit for generating an output pulse at a predetermined time related to the application of an input trigger pulse comprising:

gating means for controlling the flow of current therethrough;

a regulated source of current connected to said gating means so that said current flows through said gating means when said gating means is in a conducting state;

a first control means connected as a bistable switch to the input of said gating means so that input trigger signals applied to said first control means will switch it from one to the other of its two stable states to determine when said gating means is conducting and nonconducting;

a signal forming means connected to said gating means so that said current flows in said signal forming means when said gating means is nonconducting to produce a comparison voltage signal;

comparator means connected at its input to said signal forming means for comparing said comparison signal with a reference voltage signal of variable amplitude;

means for applying a reference voltage signal to said comparator means so that said comparator means is nonconducting until the voltage of said comparison signal exceeds that of said reference signal and renders said comparator means conducting to produce a difference signal output, and for varying the voltage of said reference signal so that it increases for each successive output pulse and results in the production of said difference signal at a progressively later time with respect to said trigger pulse;

second control means connected as a bistable switch to the output of said comparator means so that said difference signal switches said second control means from one to the other of its two stable states to produce an output trigger signal;

feedback means connected from said second control means to said first control means so that a portion of said output trigger signal is transmitted through said feedback means to switch said first control means back to its one stable state and to render said gating means conducting;

output pulse generator means connected as a monostable oscillator to said second control means to produce one output pulse for each output trigger signal; and unidirectional coupling means connected between said second control means and said output pulse generator means so that a portion of said output trigger signal is transmitted through said coupling means to trigger said pulse generator means to produce an output pulse, and so that a portion of said output pulse is transmitted through said coupling means to switch said second control means back to its one stable state.

4. An electrical circuit for generating an output pulse at a time related to the application of an input trigger pulse which varies in a predetermined controllable manner, comprising:

a gating means for controlling the flow of current therethrough;

a regulated source of current connected to said gating means so that said current flows through said gating means when said gating means is in a conducting state;

a first control means connected as a bistable multivibrator to the input of said gating means to determine when said gating device is conducting and nonconducting;

a signal forming means connected to said gating means so that said current flows in said signal forming means when said gating means is nonconducting to produce a ramp voltage comparison signal;

triggering means for applying input trigger pulses to said first control means to switch it from one to the other of its two stable states so that said gating means is rendered nonconducting;

a comparator means connected at its input to said signal forming network for comparing said comparison signal with a reference voltage signal to produce a difference signal;

reference means for applying a reference signal to said comparator means so that said comparator means is nonconducting until the voltage of said comparison signal exceeds that of said reference signal and renders said comparator means conducting to produce said difference signal and for varying the voltage of said reference signal so that it increases for each successive output pulse and results in the production of said difference signal at a progressively later time with respect to said input trigger pulse;

a second control means connected as a bistable multivibrator to the output of said comparator means so that said difference signal switches said second control means from one to the other of its two stable states to produce an output trigger signal;

a feedback means connected from said second control means to said first control means so that a portion of said output trigger signal is transmitted through said feedback device to switch said first control means back to its one stable state and to render said gating means conducting;

an output pulse generator means connected as a monostable multivibrator to said second control means to produce one output pulse for each output trigger signal; and a unidirectional coupling means connected between said second control means and said output pulse generator means so that a portion of said output trigger signal is transmitted through said coupling means to trigger said pulse generator means to produce an output pulse, and so that a portion of said output pulse is transmitted through said coupling means to switch said second control means back to its one stable state.

5. An electrical circuit for generating an output pulse at a time related to the application of an input trigger pulse which varies in a predetermined controllable manner, comprising:

a gating device having an emitting electrode, a collecting electrode and a control electrode;

a regulated source of current connected to said gating device so that said current flows between the collecting and emitting electrodes of said gating device when said gating device is in a conducting state;

a first control device having an intermediate negative conductance in its forward operating characteristic connected as a bistable multivibrator to the control electrode of said gating device to determine when said gating device is conducting and nonconducting;

a signal forming network connected to said gating device so that said current flows in said network when said gating device is nonconducting to produce a ramp voltage comparison signal;

means for applying input trigger pulses to said first control device to switch it from one to the other of its two stable states so that said gating device is rendered nonconducting;

a comparator device having an emitting electrode, a collecting electrode and a control electrode connected at its input to said signal forming network for comparing said comparison signal with a reference voltage signal to produce a difference signal;

means for applying a stairstep reference voltage signal to said comparator device so that said comparator device is nonconducting until the voltage of said comparison signal exceeds that of said reference signal and renders said comparator device conducting to produce a difference signal output, and for varying the amount of voltage of said reference signal so that it increases one stairstep for each successive output pulse and results in the production of said difference signal at a progressively later time with respect to said trigger pulse;

a second control device similar to said first control device, connected as a bistable multivibrator to the output of said comparator device so that said difference signal switches said second control device from one to the other of its two stable states to produce an output trigger signal;

a feedback device connected from said second control device to said first control device so that a portion of said output trigger signal is transmitted through said feedback device to switch said first control device back to its one stable state and to render said gating device conducting;

an output pulse generator device connected as a monostable oscillator to said second control device to produce one output pulse for each output trigger signal; and a unidirectional coupling device connected between said second control device and said output pulse generator device so that a portion of said output trigger signal is transmitted through said coupling device to trigger said pulse generator device to produce an output pulse, and so that a portion of said output pulse is transmitted through said coupling device to switch said second control device back to its one stable state.

6. A signal generator and comparator circuit comprising:

a gating transistor;

a regulated source of current connected to said gating transistor;

a signal forming network connected to said gating transistor so that the conductive condition of said gating transistor controls the current flow through said network which produces a comparison voltage signal in said network;

a first tunnel diode connected as a bistable multivibrator to the input of said gating transistor to control the conductive condition of said gating transistor in response to input trigger pulses which switch said first tunnel from one to the other of its two stable states;

a comparator transistor connected to the output of said signal-forming network so that said comparison signal is applied to the input of said comparator transistor;

means for applying a reference voltage signal to said comparator transistor so that a difference signal is produced at the output of said comparator transistor when the voltage of said comparison signal exceeds that of said reference signal;

a second tunnel diode connected as a bistable multivibrator to the output of said comparator transistor so that said difference signal switches said second tunnel diode from one to the other of its two stable states to produce an output trigger signal;

a feedback device connected from said second tunnel diode to said first tunnel diode to transmit a portion of said output trigger signal through said feedback diode to revert said first tunnel diode back to its original one stable state and to change the conduction of said gating transistor;

a third tunnel diode connected as a nonstable oscillator to said second tunnel diode to produce one output pulse for each output trigger signal received; and a coupling device connected between said second tunnel diode and said third tunnel diode to transmit a portion of said output trigger signal through said coupling device to trigger said third tunnel diode so that it produces an output signal which is partially transmitted through said coupling device to revert said second tunnel diode back to its one stable state.

7. A fast ramp generator and comparator circuit to produce an output pulse which is related in time to an input trigger pulse by a time interval which varies in a controlled manner, comprising:

a gating transistor;

a signal forming network including at least one capacitor connected to said gating transistor so that said current flows through said network when said gating transistor is nonconducting to produce a fast ramp voltage signal;

a first tunnel diode connected as a bistable multivibrator to the input of said gating transistor so that input trigger pulses applied to said first tunnel diode switch it from one to the other of its two stable states and to render said gating transistor nonconducting;

a comparator transistor connected to the output of said signal-forming network so that said ramp voltage signal is applied to the input of said comparator transistor;

means for applying a stairstep voltage reference signal to said comparator transistor so that a difference signal is produced at the output of said comparator transistor when the voltage of said ramp signal exceeds that of said reference signal;

a second tunnel diode connected as a bistable multivibrator to the output of said comparator transistor so that said difference signal switches said second tunnel diode from one to the other of its two stable states to produce an output trigger signal;

a feedback diode connected from said second tunnel diode to said first tunnel diode to transmit a portion of said output trigger signal through said feedback diode to switch said first tunnel diode back to its one stable state and to render said gating transistor conducting;

a third tunnel diode connected as a monostable oscillator to said second tunnel diode to produce one output pulse for each output trigger signal received; and a backward diode connected between said second tunnel diode and said third tunnel diode to transmit a portion of said output trigger signal through said backward diode to trigger said third tunnel diode so that is produces an output signal which is partially transmitted through said backward diode to switch said second tunnel diode back to its one stable state.

8. A fast ramp generator and comparator circuit for use in a sampling type of cathode ray oscilloscope to produce an output pulse which is related in time to an input trigger pulse by a time interval which varies in a controlled manner, comprising:

a gating transistor having an emitter, a collector and a base;

a source of current connected to said gating transistor so that said current flows between the emitter and collector of said gating transistor when it is in a conducting state;

a signal forming network including at least one capacitor connected to said gating transistor so that said current flows through said network when said gating transistor is nonconducting to produce a fast ramp voltage signal;

a first tunnel diode connected as a bistable multivibrator to the input of said gating transistor;

means for applying input trigger pulses to said first tunnel diode to switch it from one to the other of its two stable states and to render said gating transistor nonconducting;

a comparator transistor having an emitter, a collector and a base connected by one electrode to said signal-forming network so that said ramp voltage signal is applied to said one electrode;

means for applying a stairstep voltage reference signal to another electrode of said comparator transistor so that a difference signal is developed on the third electrode of said comparator transistor at the output thereof when the voltage of said ramp signal exceeds that of said reference signal;

a second tunnel diode connected as a bistable multivibrator to the output of said comparator transistor so that said difference signal switches said second tunnel diode from one to the other of its two stable states to produce an output trigger signal;

a feedback diode connected from said second tunnel diode to said first tunnel diode to transmit a portion of said output trigger signal through said feedback diode to switch said first tunnel diode back to its one stable state and to render said gating transistor conducting;

a third tunnel diode connected as a monostable oscillator to said second tunnel diode produces one output pulse for each output trigger signal received and connected to transmit a portion of said output pulse to said means for applying said reference signal in order to increase the voltage of said reference signal one stairstep for each successive output pulse; and a backward diode connected between said second tunnel diode and said third tunnel diode to transmit a portion of said output trigger signal through said backward diode to trigger said third tunnel diode so that it produces an output signal which is partially transmitted through said backward diode to switch said second tunnel diode back to its one stable state.

9. A fast ramp generator and comparator circuit for use in a sampling type of cathode ray oscilloscope to produce an output pulse which is related in time to an input trigger pulse by a time interval which varies in a controlled manner, comprising:

a gating transistor having an emitter, a collector and a base;

a regulated source of current connected to said gating transistor so that said current flows between the emitter and collector of said gating transistor when it is in a conducting state;

a signal forming network including a plurality of different capacitors connected by a selector switch to the output of said gating transistor so that said current flows through at least one of said capacitors when said gating transistor is nonconducting to produce a fast ramp voltage signal;

a first tunnel diode connected as a bistable multivibrator to the base of said gating transistor;

means for applying input trigger pulses to said first tunnel diode to switch it from one to the other of its two stable states and to render said gating transistor nonconducting;

a comparator transistor having an emitter, a collector and a base connected by its emitter to said signal-forming network so that said ramp voltage signal is applied thereto;

means for applying a stairstep voltage reference signal to the base of said comparator transistor so that a difference signal is developed on the collector of said comparator transistor at the output thereof when the voltage amplitude of said ramp signal exceeds that of said reference signal, said reference signal increasing one stairstep in amplitude for each successive output pulse produced;

a second tunnel diode connected as a bistable multivibrator to the output of said comparator transistor so that said difference signal switches said second tunnel diode from one to the other of its two stable states to produce an output trigger signal;

a feedback diode connected from said second tunnel diode to said first tunnel diode to transmit a portion of said output trigger signal through said feedback diode to switch said first tunnel diode back to its one stable state and to render said gating transistor conducting;

a third tunnel diode connected as a monostable oscillator with a reactive impedance load to said second tunnel diode to produce one output pulse for each output trigger signal received; and a backward diode connected between said second tunnel diode and said third tunnel diode to transmit a portion of said output trigger signal through said backward diode to trigger said third tunnel diode so that it produces an output signal whose trailing edge is transmitted through said backward diode to switch said second tunnel diode back to its one stable state.

References Cited by the Examiner

UNITED STATES PATENTS

| | | | |
|---|---|---|---|
| 2,414,188 | 1/1947 | Rieke | 328—185 X |
| 2,562,188 | 7/1951 | Hance | 328—185 |
| 2,596,167 | 5/1952 | Philpott | 328—185 |

ARTHUR GAUSS, *Primary Examiner.*

M. LEE, J. JORDAN, *Assistant Examiners.*